July 1, 1958   P. G. McCARTHY ET AL   2,841,001
STRAIGHT BAR KNITTING MACHINE
Filed April 24, 1953   12 Sheets-Sheet 4
FIG. 3.A.
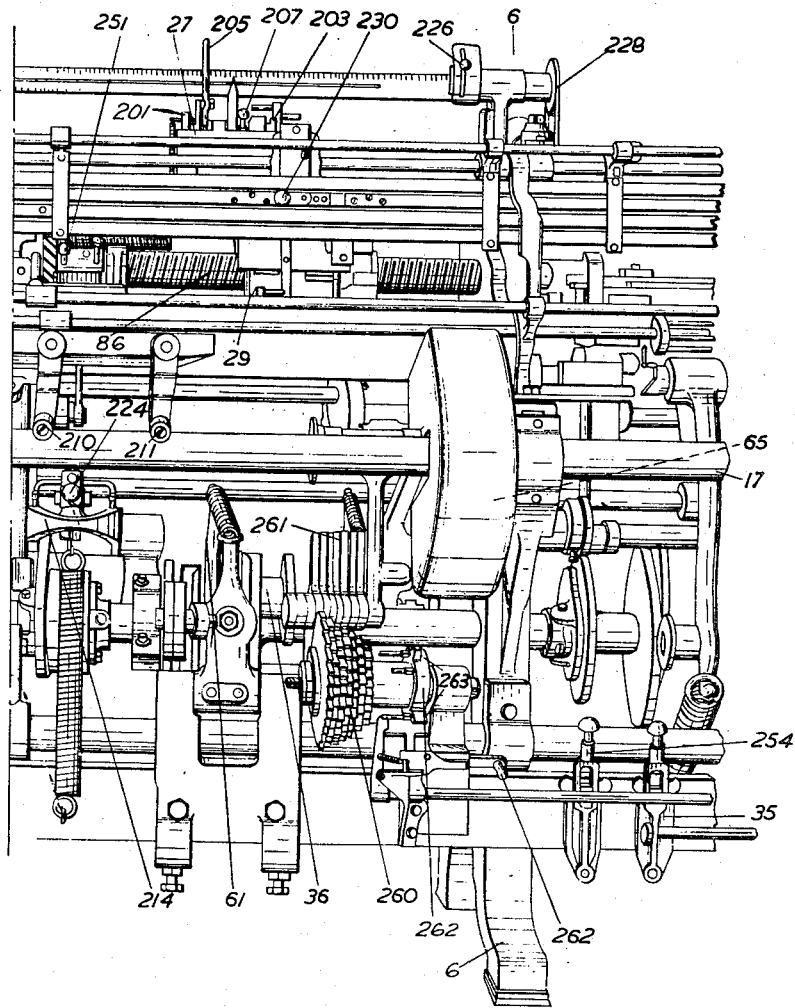
Inventors:
PATRICK GIDEON McCARTHY
AND DENIS WINFIELD
By

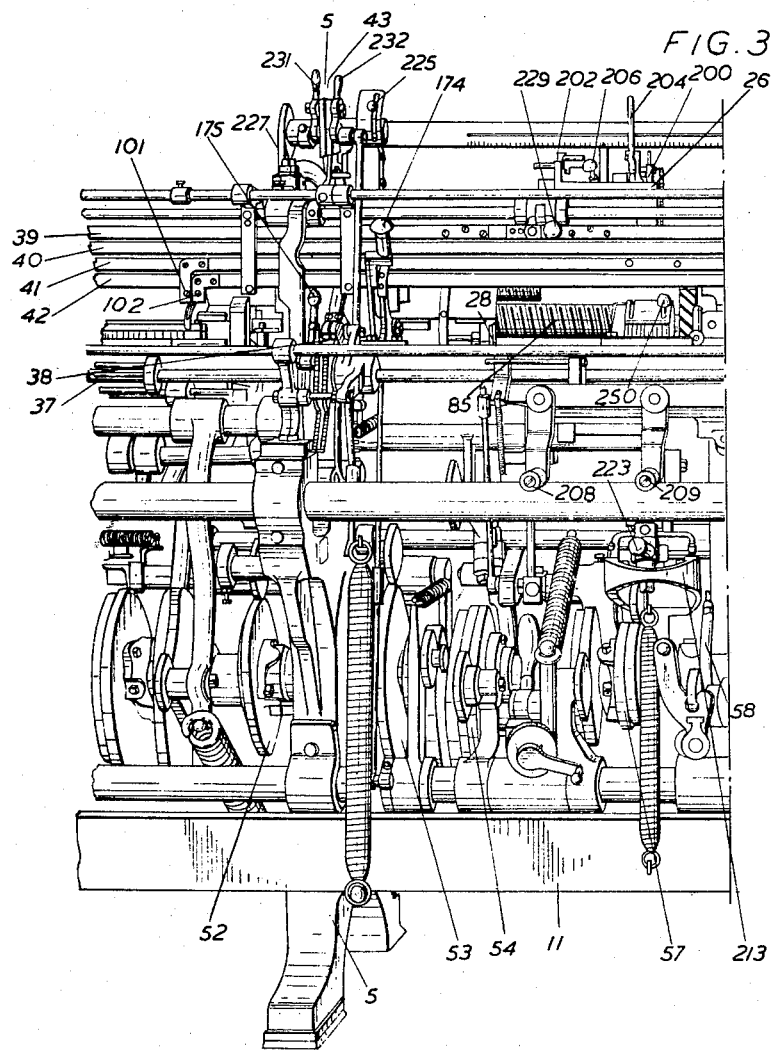

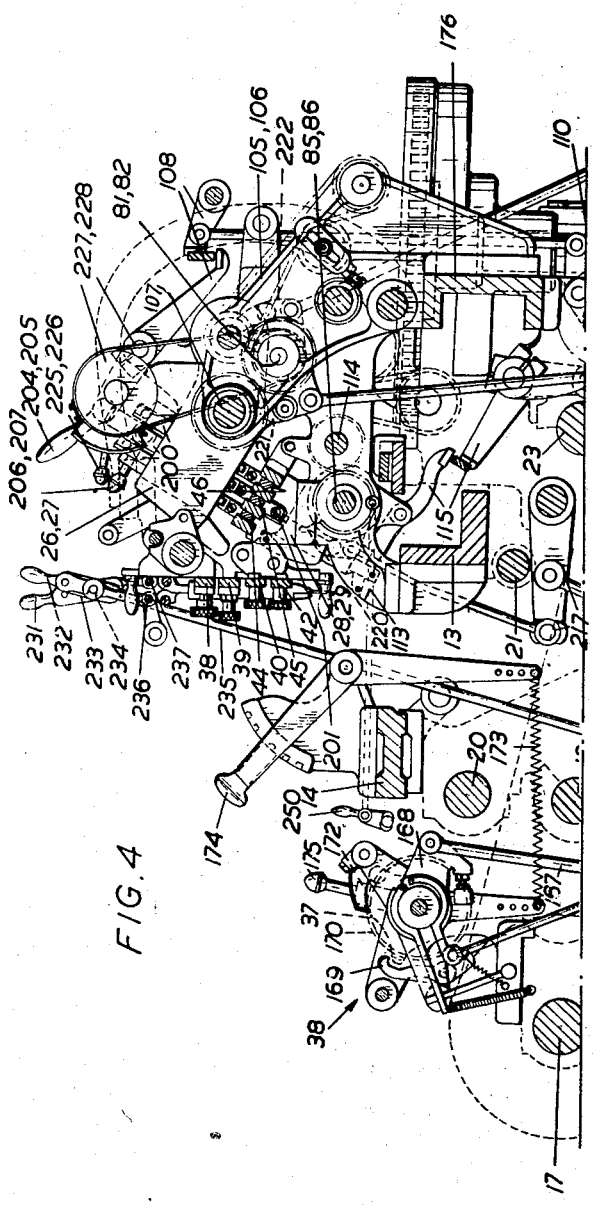

July 1, 1958
P. G. McCARTHY ET AL
2,841,001
STRAIGHT BAR KNITTING MACHINE
Filed April 24, 1953
12 Sheets-Sheet 6
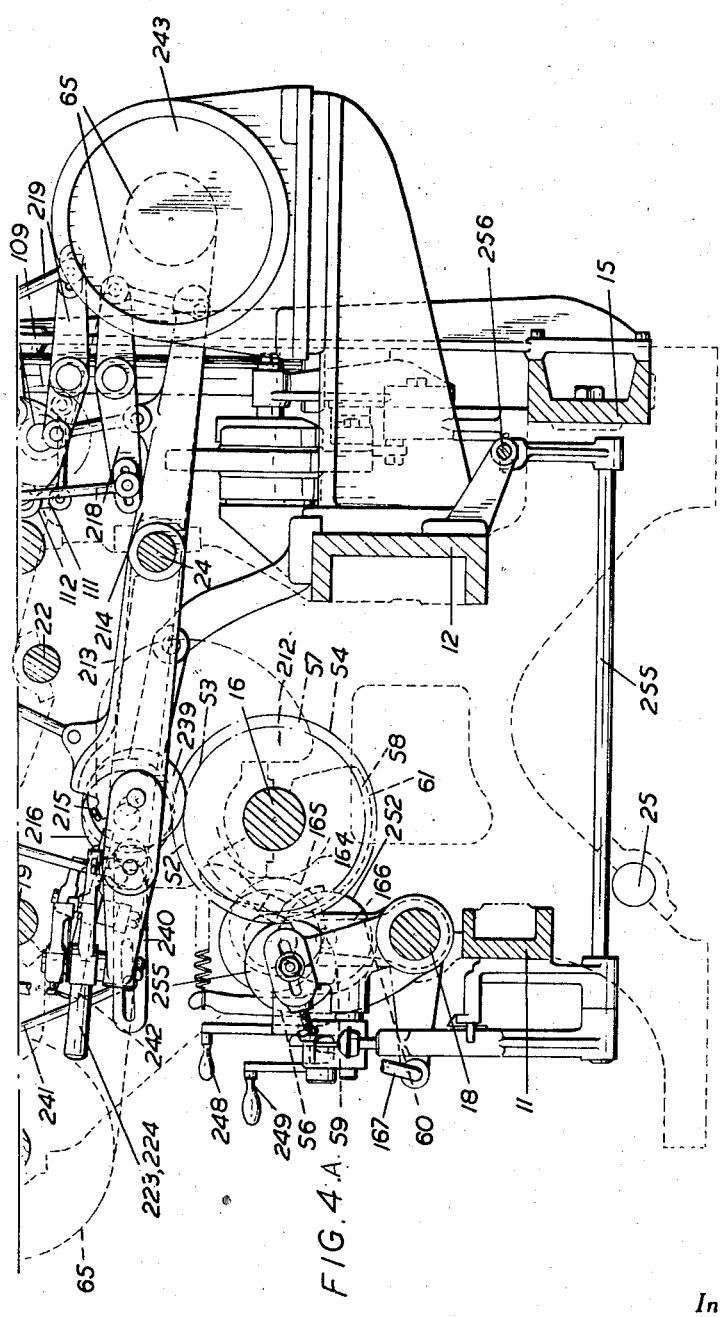
FIG. 4.A.
Inventors:
PATRICK GIDEON McCARTHY
AND DENIS WINFIELD
By

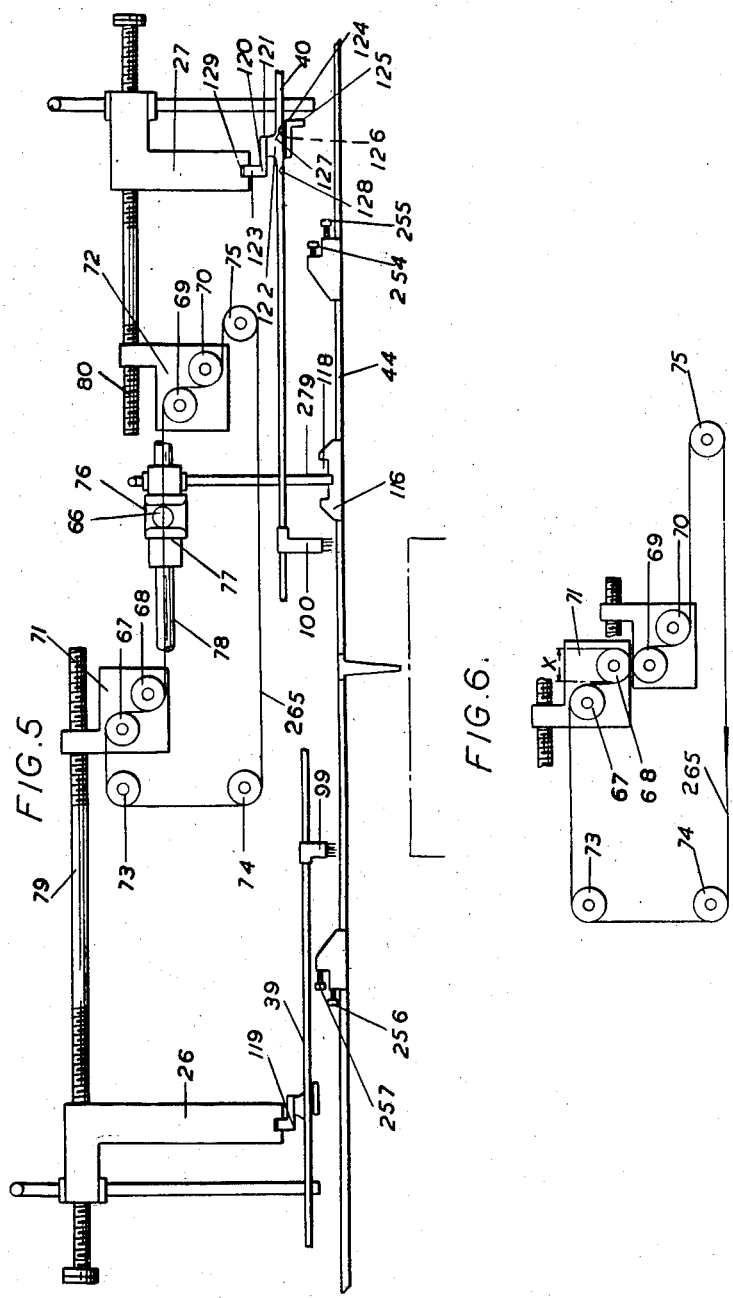

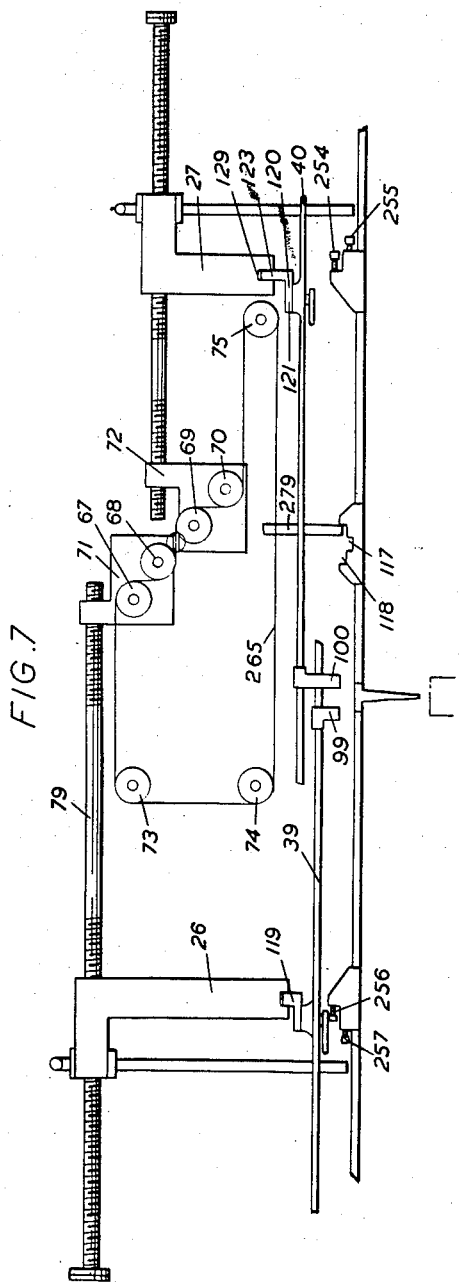

July 1, 1958

P. G. McCARTHY ET AL 2,841,001

STRAIGHT BAR KNITTING MACHINE

Filed April 24, 1953

Inventors:
PATRICK GIDEON McCARTHY
AND DENIS WINFIELD
By

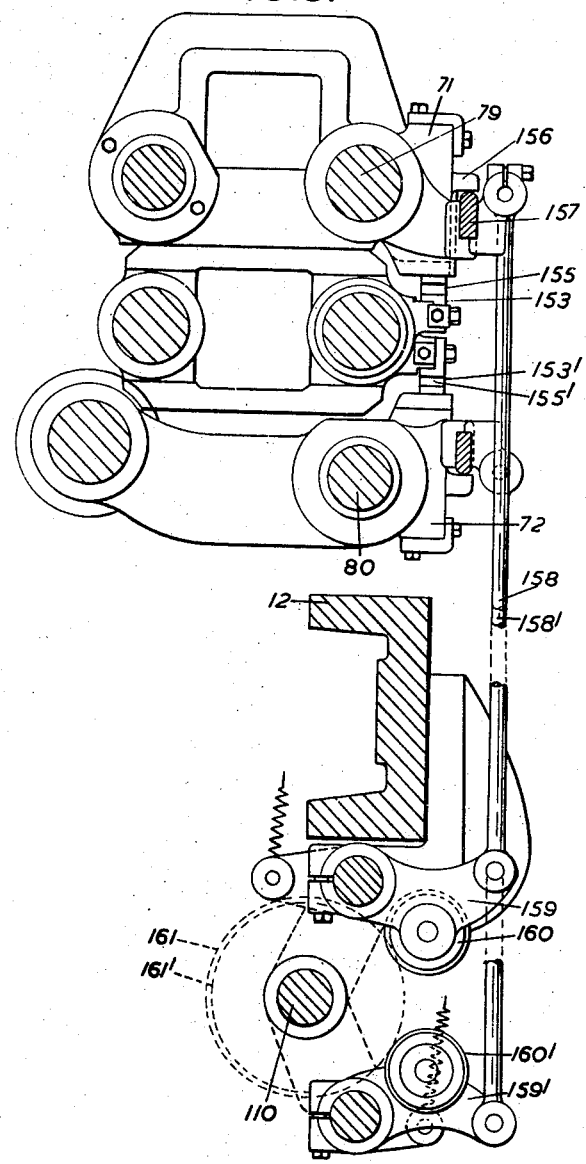

July 1, 1958     P. G. McCARTHY ET AL     2,841,001
STRAIGHT BAR KNITTING MACHINE
Filed April 24, 1953     12 Sheets-Sheet 11
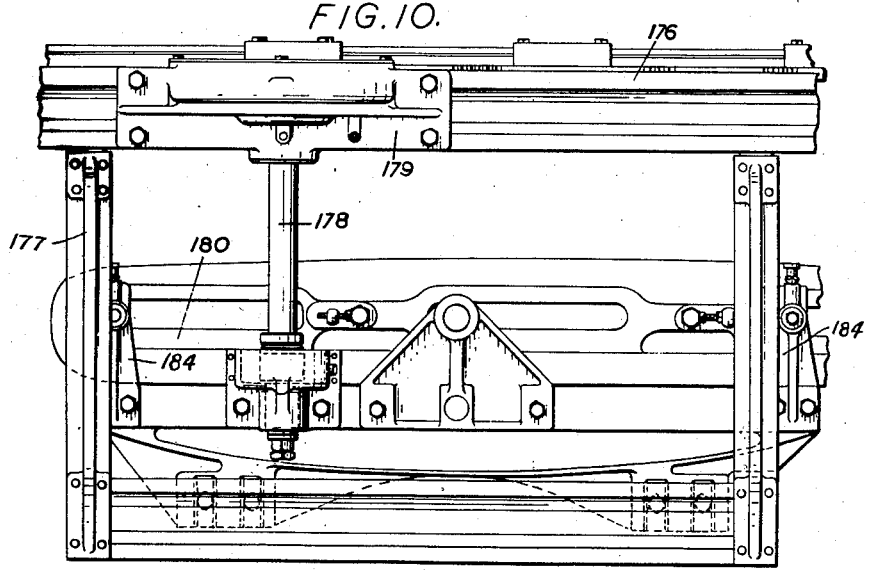
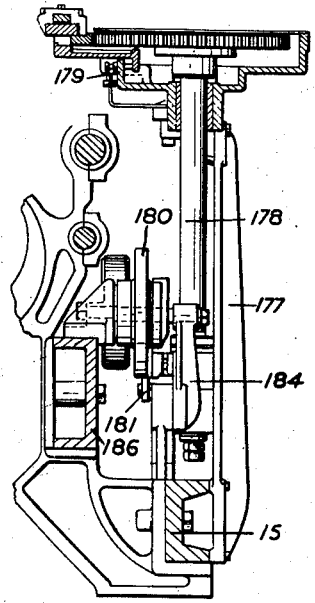
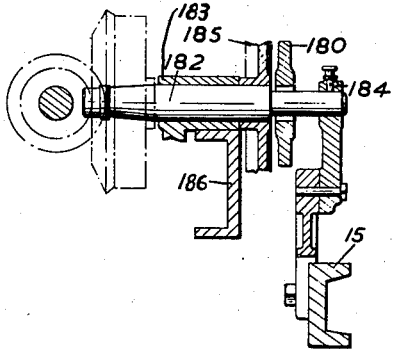
Inventors:
PATRICK GIDEON McCARTHY
AND DENIS WINFIELD
By July 1, 1958 P. G. McCARTHY ET AL 2,841,001
STRAIGHT BAR KNITTING MACHINE
Filed April 24, 1953 12 Sheets-Sheet 12
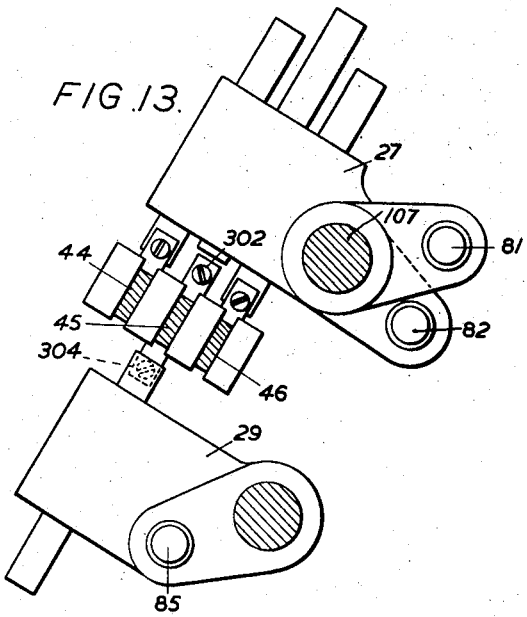
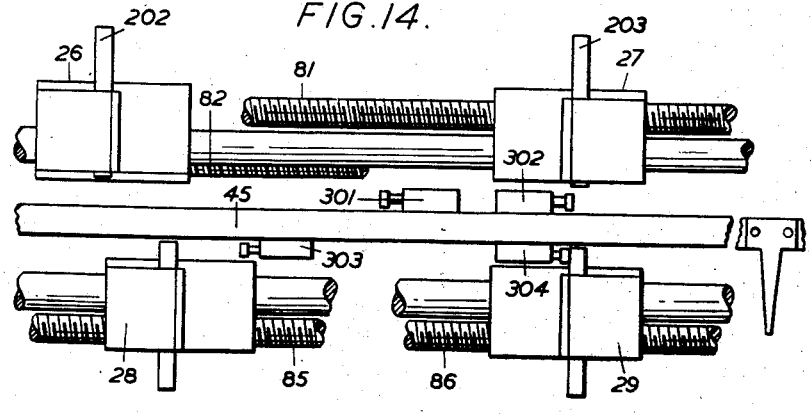
Inventors:
PATRICK GIDEON McCARTHY
DENIS WINFIELD
By

United States Patent Office 2,841,001
Patented July 1, 1958

2,841,001

STRAIGHT BAR KNITTING MACHINE

Patrick Gideon McCarthy, Loughborough, and Denis Winfield, Shepshed, England, assignors to William Cotton Limited, Loughborough, England Application April 24, 1953, Serial No. 350,851

Claims priority, application Great Britain January 28, 1953

16 Claims. (Cl. 66—82)

This invention is for improvements in or relating to straight bar knitting machines and has particular although not exclusive reference to those multi-division machines known as pant frames or underwear and outerwear machines. These latter machines have usually been characterised by the provision of comparatively long needle bars with comparatively coarse gauge needles, filling-up points and associated mechanisms for filling-up eyelet holes formed during widening, mechanism whereby knitted garments other than knitted footwear may be produced, various hand controls, and comparatively long adjusting lead screws which are independently operable and associated mechanism such that work which may be termed non-symmetrical may be produced.

In these pant frames or underwear and outerwear machines, all the divisions except the end divisions usually have needle bars and associated mechanisms and the end divisions have been provided for accommodating mechanism such for example as certain lead screws and associated mechanism including displaceable bolts, racking means for narrowing or widening, hand control mechanism for controlling the extent of each fashioning, fabric draw-off mechanism, parts of striping mechanism and carrier bars, and various hand controls, including controls for initial setting of lead screws, for these and other parts. The nature of work produced on these machines is such that fairly frequent operation of such hand controls (and others) is necessary thereby dis-advantageously taking up an appreciable amount of the operator's time and energy, and it will be understood that if, as is intended by the present invention, a machine is produced to operate at a faster speed than usual, and special means are not provided, the further dis-advantage will exist that there will be less time for the operator to move to and from and operate the controls; another dis-advantage is that operators have been known to be injured by moving parts at the ends of the machine, and of course there is the still further dis-advantage that the end divisions are non-productive and undesirably add to the length of the machine and to the occupied floor space.

An object of the invention is to provide a pant frame or underwear and outerwear machine which does not have the above dis-advantages.

The invention provides a pant frame or underwear and outerwear machine comprising a plurality of needle divisions and at least one non-needle division at an intermediate location. There is thus only one non-needle division instead of two non-needle divisions. Preferably this intermediate non-needle division is disposed centrally of the length of the machine and there is a multiplicity of hand controls also disposed in the region of the centre of the machine i. e. at least mainly in said centre division. By this means operators time and energy is saved by not having to frequently operate controls at the ends of the machine.

To enable satisfactory employment of one non-needle division instead of two, at least two adjusting lead screws overlap one another lengthwise of the machine in the non-needle division. Conveniently, main and auxiliary adjusting lead screws overlap and are disposed on opposite sides of a thread carrier rod which carries stop lugs on each side for engagement by displaceable stops on stop boxes on the respective lead screws; generally at least a pair of the stop lugs will overlap on opposite sides of the carrier rod. Other mechanisms which have heretofore been at the end of the machine and may be conveniently accommodated in the non-needle division are the aforesaid mechanism associated with the lead screws just mentioned, displaceable bolts with hand controls, racking means for narrowing or widening with hand controls, hand control mechanism for controlling the extent of each fashioning, fabric draw off mechanism with hand controls, hand controlled mechanism for initial setting of lead screws, hand controls for filling up points, hand controlled mechanism for stitch quality, cam shaft shogging means with hand controls for frequency of fashioning, and hand controls for striping mechanism.

There may be also provided drive means for the machine located in the region of the centre of the machine such that drive shafts are shortened and have less torque. An important general advantage of a machine as above is that there may be so many needle divisions on each side of a central non-needle division as to be collectively a greater number than is practicable between end non-needle divisions; furthermore each set of divisions may, to a certain extent, be separate units driven and controlled from mechanism in the non-needle division.

The invention also provides a pant frame or underwear and outerwear machine comprising a plurality of needle divisions, at least one non-needle division at an intermediate location, a plurality of hand controls located in said non-needle division and all mechanism in the machine confined between end standards of the machine.

Other mechanism which may be incorporated at convenient positions throughout the length of the machine are, two flexible drive carrier control mechanisms (e. g. as disclosed in co-pending U. S. patent application Serial No. 350,852) each for positively driving thread carriers and incorporating adjustable lead screws and stops, motion transmitting means connecting appropriate lead screws for simultaneous adjustment, lead screws and associated mechanism such as for splicing and waste courses, displaceable bolts for connecting fashioning finger bars or stops, anti-rebound mechanism for carriers, half speed control mechanism, striping mechanism, and carrier bars (e. g. as disclosed in co-pending U. S. patent application Serial No. 350,936, now abandoned.

The machine may also be characterised in the provision of a top back rail for certain mechanisms such as lead screws and carrier control mechanism and for stiffening the framework of the machine for the slur bar and carrier motions, and suitable additional supports are preferably provided for this top back rail. Said back rail may provide support means for part of the draw mechanism of the latter for example includes the vertical shaft drive arrangement disclosed in U. S. Patent No. 2,428,465. Furthermore, the draw-mechanism may be improved by for example spaced bearings for the draw cross shaft and other means.

Furthermore it is known in said pant frames or underwear and outerwear machines for the main carrier drive to be through a flexible element such as a chain so as to be positive, and variation of the carrier traverse has been effected by adjustment of lead screws carrying sprocket boxes on which sprockets for guiding the flexible element are mounted. However in this drive there is a limit to which the boxes may be adjusted towards each other, and, therefore, for the purpose of producing particularly narrow fabric, another carrier has been employed driven frictionally; dis-advantages of this, which it is an object of the invention to overcome, are that the machine speed is reduced for a friction drive and constant lead mechanism is not operative, with dis-advantageous results, known in the art.

The invention further provides a straight bar knitting machine having positive drive means for driving a thread carrier and lost motion means constructed and arranged for the drive to be effective on the carrier for comparatively short distances only when it is desired to produce comparatively narrow fabric. Conveniently there is provided a connection between the drive means and a thread carrier which is variable to provide positive drive to the thread carrier either directly or with a lost motion. For fashioning of the comparatively narrow fabric, a displaceable device may be provided for displacing transfer points relatively to adjustable stops to which they are connected in a direction inwardly of the needle bar; this displaceable device may include an eccentric.

In carrier drive mechanism which employs a flexible element such as a chain having a roller device which is adapted to be coupled and uncoupled to and from a slotted slipper (the latter being connected to a thread carrier) by traversing the chain round sprockets mounted on an adjustable box, it is known to provide anti-rebound means for the carrier comprising a fixed catch on the slipper which is adapted to be engaged, by automatic means at the end of the traverse of the carrier, with an anti-rebound stop comprising a bolt, which is mounted on the sprocket box and is releasable by the automatic means. In operation, the automatic means connects the bolt to the catch immediately after the carrier reaches the end of its movement and dis-engages the bolt from the catch immediately prior to the return of the carrier; a dis-advantage of this is that there is undesirable freedom of movement of the carrier at the end of its movement before the time that the bolt is engaged in the catch.

According to the invention, dual catch means are provided associated with the slipper and sprocket box comprising positive and resilient catch devices of such construction that both catch devices automatically engage at the end of the traverse of the slipper and carrier, the resilient catch device remaining engaged until the slipper and carrier return and then automatically releasing, and the positive catch device remaining engaged until the end of the traverse of the chain and being released by automatic means immediately upon return of the chain. The positive catch device conveniently includes an anti-rebound bolt carried by the sprocket box and operated by a cam on a half speed shaft such that the bolt is held in operative position throughout alternate courses and in inoperative position throughout the remaining courses thereby to allow for the production of what may be termed non-symmetrical work for which it may be necessary for the carrier to start and stop its traverse at one side of the centre of the needle bar. The anti-rebound bolt will always be in operation for fashioning, and anti-rebound catches acting on the carrier are also operable from the half speed shaft in cooperation with the above arrangement.

The foregoing and other features of the invention are incorporated in the construction which is hereinafter described, as a specific embodiment with reference to the accompanying drawings.

Figures 3 and 3A combined constitute an enlarged front view of the centre part of the machine.

Figures 4 and 4A combined constitute a cross sectional view of Figure 3.

Figure 5 is a diagrammatic view illustrating carrier drive means and associated mechanism.

Figure 6 is a detailed view of the carrier drive in a different position from that in Figure 5.

Figure 7 is a similar view to Figure 5 with the parts in different positions.

Figure 8:
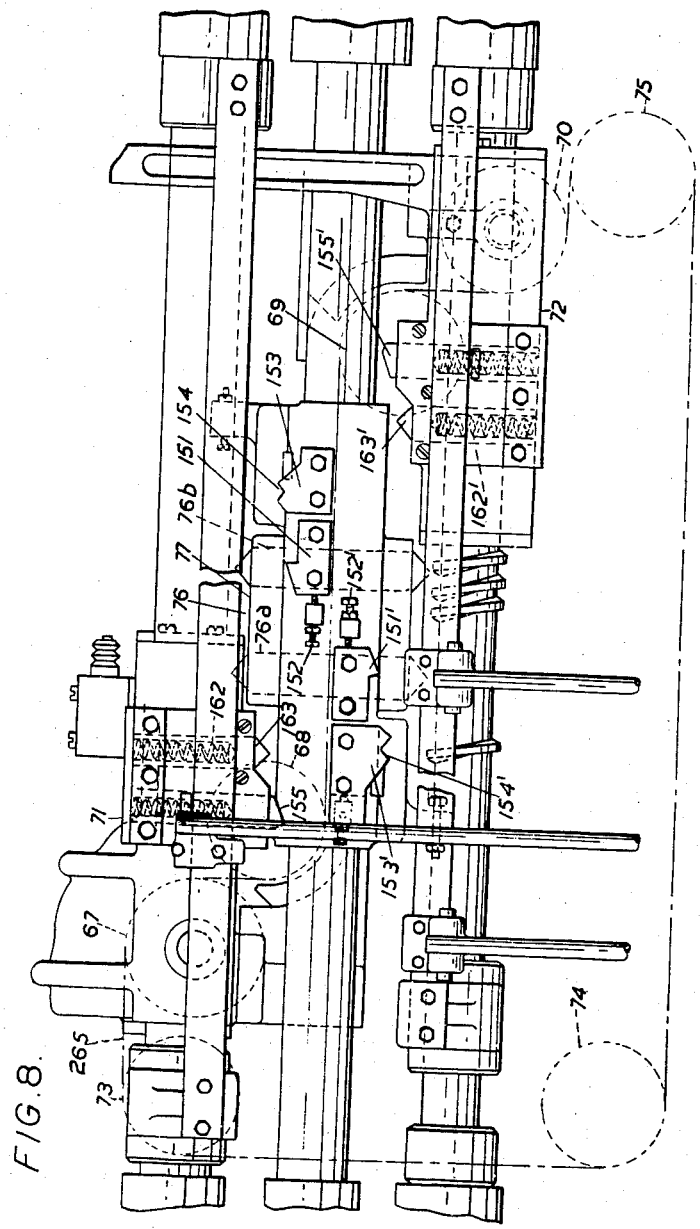

Figure 8 is an enlarged elevational detail view showing anti-rebound stop mechanism.

Figure 9 is a cross sectional view of Figure 8.

Figure 10 is a rear view in the region of draw-mechanism in the machine.

Figure 11 is a cross sectional view of Figure 10.

Figure 12 is a detail cross sectional view through the draw cross shaft.

Figure 13 is a detail cross sectional view of thread carrier stop control mechanism.

Figure 14 is a detail front view thereof.

Figure 1:
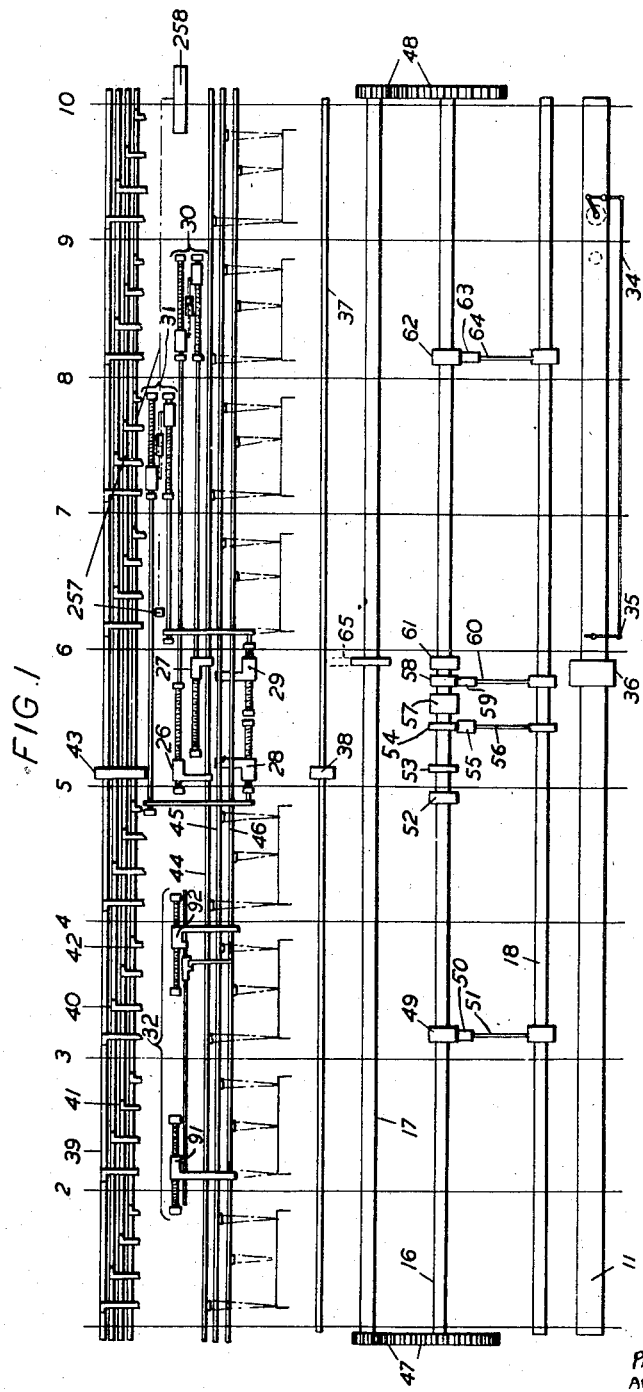
Figure 1 is a general diagrammatic view illustrating suitable positions for various mechanisms in a straight bar knitting machine according to the invention.

Referring now to Figure 1 the straight bar machine illustrated consists of a plurality (in this example ten) of transverse standards 1 to 10 which are connected together by longitudinal rails (see also Figure 4) such as a front rail 11, a back rail 12 and 176, a head rail 13, a template rail 14 and any other desired rails such as 15. The standards provide bearings for various longitudinal shafts such for example as a main cam shaft 16, a driving shaft 17, a quality shaft 18 and any other suitable shafts such as is indicated by the reference numerals 19 to 25 (Figures 4 and 4A). In between each successive pair of standards except 5 and 6 there is provided a needle bar and associated mechanism to constitute an eight-at-once machine, and substantially all mechanisms necessary for the operation of the needle bars and other parts are located within the distance between the end standards 1 and 10. More specifically in the centre non-needle division there may be two main selvedge stops 26, 27 (see also Figure 2) with associated mechanism and two auxiliary stops 28, 29 and associated mechanism disposed for example below the main stops 26 and 27. A main carrier control or drive mechanism 30 may be disposed towards one end of the machine say between standards 8 and 9 and an auxiliary carrier control or drive mechanism 31 may be similarly disposed between standards 7 and 8; connection to carrier, however, may be through the medium of a coupling box disposed within the region of the centre of the machine. Towards the other end of the machine there may be provided friction drive means indicated generally by reference numeral 32 for a splicing carrier 46 and adjustable stops 91, 92. Mechanism for striping including a striping chain is provided indicated by reference numeral 34 and there is a hand control indicated at 35; shogging mechanism is provided indicated at 36. Actual striping mechanism may be substantially centrally disposed or it may be disposed partly at one end of the machine with connection to substantially central hand control. Tension draw-off mechanism is indicated by a work roller 37 having control means indicated at 38, and fashioning finger bars are indicated at 39 to 42; control mechanism for filling-up points is indicated at 43. Carrier rods are indicated at 44, 45, 46. The driving shaft 17 conveniently drives the cam shaft 16 through the medium of gears indicated generally at 47 and 48, and on the cam shaft 16 there are various cams such for example as cam 49 for operating the truck 50 of a truck lever 51 on the quality shaft 18, cam 52 for the work roller, cam 53 for filling-up point mechanism, cam 54 for operating the truck 55 of a truck lever 56, on the quality shaft 18 for a slack course, cam 57 for selvedge stops, a cam 58 for operating a truck 59 of a truck lever 60 on the quality shaft, cam 61 for shogging and fashioning control, and a cam 62 for operating a truck 63 of a truck lever 64 on the quality shaft for side splicing and slackening. There may also be a half speed shaft (hereinafter referred to) driven through the medium of a chain for example from the draw shaft. Any other desired mechanism may be incorporated in the machine between the end standards. The main stops 26 and 27 are for the carrier rod 44 and are adjustable on lead screws 81, 82 respectively simultaneously with the adjustment of sprocket boxes 71, 72 for the carrier control or drive mechanisms 30, 31 and for this purpose lead screws 79 and 80 of said mechanism may be respectively connected to the lead screws 81 and 82 by suitable means indicated by way of example at 83 and 84, there being provided clawker mechanism hereinafter referred to for racking the screws conveniently located adjacent to the appropriate screws. It will be observed that the screws 81 and 82 overlap each other lengthwise of the machine and furthermore that the two screws 81 and 82 overlap two auxiliary screws 85, 86 on which the auxiliary stops 28 and 29 are mounted. These screws 85 and 86 are respectively connected by suitable means generally indicated at 87, 88 to the screws 79', 80' for simultaneous adjustment.

It is to be further noted that the main lead screws 81, 82 are above the carrier rods (see particularly Figures 13 and 14) and the auxiliary lead screws 85, 86 are below the carrier rods, with the stop boxes 26, 27, 28, 29 having displaceable stop bolts (hereinafter referred to) for engagement by stop lugs 301, 302, 303 and 304 respectively on carrier rod 45. Lugs 301 and 302 are on the top of the carrier for striping and lugs 303, 304 are on the bottom for fashioning of a V neck; lugs 302, 304 overlap.

Thread carrier bar 44 is connected to the carrier control 30, carrier rod 45 is connected to the carrier control 31 and carrier rod 46 is connected to the friction control 32 (Figure 1).

The main stops 26 and 27 are connected to the fashioning finger bars 39 and 40 respectively and the auxiliary stops 28 and 29 are connected to the finger bar 41 and 42 respectively by mechanism indicated generally at 95 to 98 respectively. The finger bars carry transfer points 99 to 102 respectively and the left hand transfer points 99 and 100 have filling-up points 103, 104, respectively, at their opposed sides.

Figure 2:
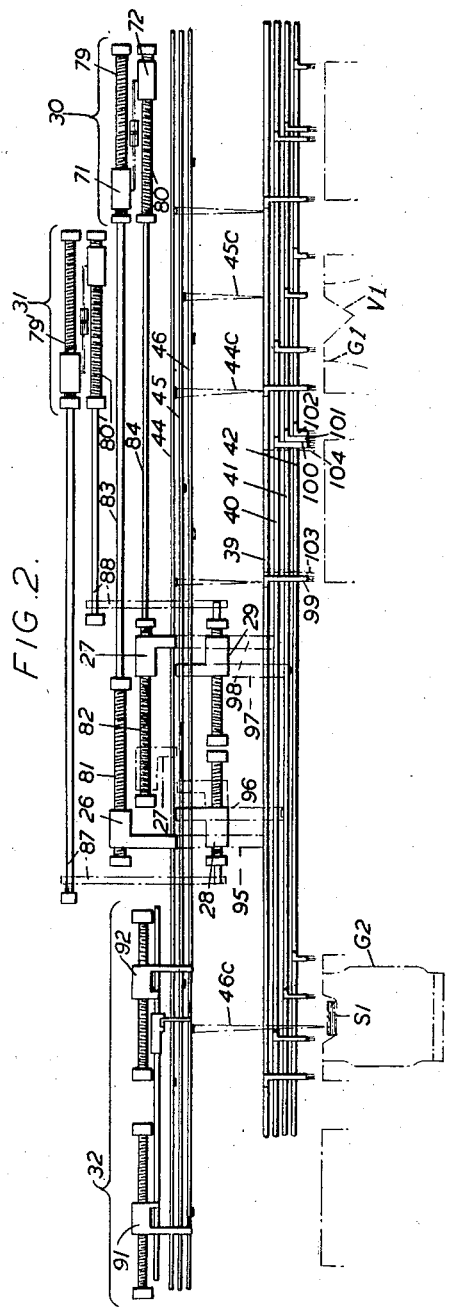
Figure 2 is a somewhat diagrammatic plan view illustrating thread carriers, transfer points and associated mechanism.

Figure 2 indicates that the machine is capable of producing differently shaped garments, for example a garment indicated at "G1" having a V neck indicated at "V1," or a garment indicated at "G2" having a square bottomed neck indicated at "S1."

The following description with reference to Figures 3 and 4 will be of mechanism in the region of the centre non-needle division.

Turning now to Figures 3 and 4 these show suitable mounting details for the screws 81, 82, 85 and 86, screws 81 and 82 being supported by brackets 105 and 106 respectively from the top back rail 176 and disposed with the screw 81 above the screw 82. The boxes 26, 27 are conveniently guided on a steady shaft 107 and they include anti-rebound bolts indicated at 200, 201 which may be rendered operative and inoperative on the carrier bar 44, 45 or 46 through the medium of link and lever mechanism indicated generally at 108 from a cam 109 on a half speed shaft 110 and driving arm 111 with truck 112.

The auxiliary screws 85, 86 may be carried by a bracket 113 from the head rail 13 and the stop boxes 28, 29 thereon may be guided on a shaft 114 and may include anti-rebound bolts 200, 201 which may be rendered operative and inoperative on the carrier bar 45 by link and lever mechanism indicated generally at 115 and through the medium of said truck arm 111 and truck 112 from the cam 109 on said half speed shaft 110.

There are also provided stop bolts some indicated at 202 and 203 on the stop boxes and all the bolts may be hand operated, the anti-rebound bolts 200 and 201 by hand levers 204 and 205 and the stop bolts 202 and 203 by hand levers 206 and 207.

The lead screws 81, 82, 85 and 86 may be hand racked by hand crank levers 208, 209, 210, 211 (Figure 3) through the medium of suitable drive transmitting means such as universal shafts and gear connections to the screws, for initial setting of the stop boxes.

The screws may be automatically racked by cams 212 (Figure 4A) on the main cam shaft through the medium of two truck levers 213, 214 having trucks 215, 216 and connected by links and levers indicated generally at 217, 218, 219 to pawls 220, 221 222 and the mechanism may be rendered operative and inoperative by hand levers 223, 224, which are adapted to shog the trucks 215, 216 on and off the cams. In the case of the pawls 221 and 222 either may be rendered operative and inoperative or controlled for different extents of fashioning by having different racking engagements with ratchets wheels fixed to the screws, by hand levers 225, 226 connected to bluffing discs for the pawls through the medium of belts and pulleys 227, 228. Pawl 220 and its equivalent for screw 86 may be rendered inoperative by hand levers 250, 251.

Hand control levers for rendering the filling-up points 103 and 104 operative and inoperative are indicated at 231, 232 and they each have transverse slots 233, 234 (for said purpose) adapted by movement of the levers to couple an operating rod 235 to either of two rods 236, 237 to which the filling-up points are connected.

Suitable draw off mechanism consists of a cam 164 (Figure 4A) operating a truck 165 on a truck arm 166, and, through a rod 167, to rack a lever 168 to which pawls 169 are fitted. Movement of the pawls 169 racks the ratchet wheel 170 to impart rotational racking movement to a draw-off roller 37, return of the ratchet wheel is prevented by pawls 172 and the extent of racking is under the control of a tension spring 173, the tension of which may be preset by means of a hand lever 174. The racking mechanism may be dis-connected from the draw-off roller by hand displaceable plunger 175.

The draw-off mechanism may be rendered operative and inoperative when desired, such as for releasing fabric tension for fashioning, by a cam 52, a truck 239 on a truck lever 240, and a link 241 connecting the truck lever 240 to the control lever 168; this mechanism may be rendered operative and inoperative by a hand lever 242 shogging the truck 239 on and off its cam.

There may also be central motor drive means for the machine comprising an electric motor 243 having a central driving connection 65 to the aforesaid front shaft 17 with the aforesaid gear train connection 48 between the shaft 17 and the cam shaft 16 of the machine. There may be different quality cams 49, 54 and 58 at different rotational positions on the main shaft 16 and controlled by hand levers 248, 249 for shogging trucks 50, 55, 59 on and off the cams for varying the quality length. A further hand lever 35 may be provided for initiating racking of a pattern chain for striping and a second hand lever 254 may be connected by rod 255 to a rear control 256 which is connected by mechanism indicated at 257 (Figure 1) to striping mechanism indicated at 258 for hand control of striping carriers.

There may be further provided cam shaft shogging mechanism indicated at 36 for operation for fashioning under control of a selection means which may consist of ratchet wheels 260 with which are associated hand controlled pawls 261 and the ratchet wheels may operate a pegged disc 262 which has lugs 263 on it for different selections, said lugs being caused to be selectively operable by adjustment of a hand movable bolt.

Turning now to Figures 5 to 7 which show means by which comparatively narrow fabric may be produced without the aid of friction drive means, it will be seen that a connection 279 from a carrier driving chain 265 to the carrier bar 44 is by means of a stepped bracket 116 fixed on the carrier bar 44 and having a central rebate 117 (Figure 7) with which connecting member 279 engages and an elongated rebate 118 with which the connecting member 279 may be caused to engage, by a sliding retraction of it, for producing narrow work. At the same time as this change is made the left hand points 99 and 100 are displaced inwardly towards each other by displacement of their finger bars 39 and 40 through the medium of eccentric devices 119, 129 by which they are connected to the respective stops 26 and 27. More specifically, as shown in Figure 5, each device 119, 120 consists of an eccentric 121 pivoted to the finger rod at 122 and having a peg 123 and the front of the pivot 122 having fixed to it a radial arm 124 on the other end of which there is a handle 125 (which may be identified by knurled knobs 229 or 230 in Figure 3) and which carries a locating plunger 126 operating with indents 127 or 128 on the finger rod. The said peg 123 is connected in a slot 129 in the stop 26 or 27 (see Figures 5 and 7) and consequently upon circular movement of the handle 125 the pivot 122 is rotated to carry the peg 123 from one side of the pivot axis to the other thereby displacing the finger bar relatively to the box, and the plunger 126 is thereby displaced from the indent 127 to the indent 128 for locating the finger bar in the new position. Stops 254, 255, 256 and 257 are at different settings to correspond with the above.

Figures 8 and 9 illustrate details of anti-rebound stop mechanism associated with the carrier drive means 30 or 31. More specifically it will be observed that the carrier driving chain 265 is shown traversible over the sprocket 67 to 70 and 73 to 75, and the slipper 77 is shown with the slot 76 formed by vertical members 76a, 76b between which the aforesaid roller 66 on the chain 265 is normally disposed. The said sprockets 67, 68 are shown mounted on the sprocket box 71 and the sprockets 69, 70 are shown mounted on the sprocket box 72. Said slipper 77 has fixed on it a catch 151 which is locatable by adjustable screw 152 and it also has fixed to it a female part 153 of a two-part automatically releasable connection, said part 153 having a V-shaped notch 154. For co-operation with the catch 151 there is provided a slidable bolt 155 carried by the sprocket box 71 and adapted to be raised and lowered by a lug 156 thereon (Figure 9) engaging a vertical displaceable part 157 which is vertically displaceable through the medium of a rod 158, bell crank device 159 and truck 160 engageable with a cam 161 on the aforesaid half speed shaft 110. For co-operation with the female part 153 there is provided a spring pressed plunger 162, as shown in Figure 8, which is carried by said sprocket box 71 and having a V-shaped lower end 163 for releasable engagement with the V-shaped notch 154 in the female part 153. Thus when the slipper 77 is moved to the left in Figure 8 the catch 151 and the female part 153 automatically engage with the bolt 155 and plunger 163 respectively precisely at the time that the roller 66 carried by the chain changes direction and ceases to impart driving force to the slipper 77 and then travels vertically between the two sprockets 67 and 68, the catches thereby holding the slipper 77 and associated thread carrier steady at the end of its traverse and it remains thus until the end of the traverse of the chain. Immediately the chain begins to reverse, the bolt 155 is automatically raised by the cam 161 clear of the catch 151 and thus is immediately released from the slipper ready for the latter to return. However, the slipper does not generally return immediately because the roller 66 on the chain 265 has previously traversed to a position beyond the sprocket box 71; instead, the roller 66 must first travel back until the roller again becomes disposed between the two sprockets 67 and 68 and re-engages the slipper, before the slipper is returned. On these occasions it will be understood that the engagement of the plunger 163 with the female part 153 temporarily ensures that the slipper is maintained steady after the bolt 155 has been released until the roller 66 re-engages the slipper. It is also to be understood that, by virtue of the half speed shaft, the bolt will remain in engaged and non-engaged positions throughout alternate courses respectively to allow for the production of the aforesaid non-symmetrical work in which the carrier may start and stop at one side of the centre of the needle bar. The operation of the bolt from the half speed shaft is also such that it remains in operation throughout fashioning. It will also be understood that similar anti-rebound stop mechanism to that just described is provided for operation during traverse of the slipper 77 to the right in Figure 8, and relevant parts are indicated (in Figures 8 and 9) by reference numerals 151' to 155' and 158' to 163'. The anti-rebound bolt of the latter mechanism operates in opposite sense to the former anti-rebound bolt. Anti-rebound bolts 200, 201 acting directly on the carrier bars are similarly controlled from the half speed shaft as previously referred to with reference to Figure 4.

Figures 10 to 12 illustrate an improved arrangement at the rear of the machine and particularly in the region of the draw-mechanism. More specifically there may be provided a top back rail 176 for certain mechanisms such as lead screws and carrier control mechanism and for stiffening the machine framework for the slur bar and carrier drive motions and this rail may be conveniently supported by suitable additional supports indicated for example at 177. Draw mechanism conveniently incorporates a vertical shaft arrangement indicated generally at 178 and said back rail 176 provides a suitable anchorage for a bracket 179 for the top end of the vertical shaft. The bottom end of the vertical shaft 178 is suitably mounted for operation by a rack on the draw bar 180 and the lower part of this draw bar 180 may be supported interiorly of the machine by a guide member 181. Furthermore the draw cam cross shaft 182 (Figure 12) may be supported in spaced bearings 183, 184 extending up from a framework rail 186 with the draw cam 185 disposed therebetween, and the draw cam 185 itself may be suitably shaped to impart force to the trucks bearing on it in such a constant direction that maximum force is transmitted to the draw bar. One of these mechanisms is for slurcocks and another for thread carriers, and whereas in the first instance the vertical shaft is connected to the slurbar by a rack and gear, in the latter case the vertical shaft is connected to the carrier drive by helical gears.

In a particular method of producing a garment on the machine, say the front part of a ladies jumper, the body of said part is conveniently produced by traverse of the carrier bar 44 under control of the main selvedge stops 26 and 27 and sprocket boxes 71, 72, the stops and boxes being stationary until it is desired to fashion the main selvedges. When fashioning is started the main selvedge stops 26 and 27 and boxes 71, 72 are racked inwards to narrow the fabric and transfer points 99 and 100 are employed for transferring the necessary loops until it is desired to commence formation of a neck opening. Assuming that a V-shaped neck opening is to be formed the following operations are carried out. The carrier rod 44 is positioned with its thread carrier 44C at a position for producing the left hand shoulder part and the main selvedge stop 27 is racked to the position shown in broken lines in Figure 2 (i. e. for the control of the carrier bar 44). Auxiliary stops 28 and 29 are introduced into operation for the control of the carrier bar 45 to produce the right-hand shoulder part by its thread carrier 45C. The fashioning fingers are disposed for the fingers 99 and 102 to be inoperative and for the fingers 100 and 101 to be operative respectively on right and left hand selvedges of the neck opening. There are no filling-up points between the two sets of points 100 and 101 and therefore they are operated simultaneously throughout the formation of the V neck fashionings. For controlling the fashioning of the neck opening the main stop 27 and auxiliary stop 28 are appropriately racked outwards to control the thread carriers 44 and 45 and finger bars 40 and 41. The employment of a positive drive with which constant lead mechanism is associated for the two carriers ensures regularity of loop formation in fabric and it is unnecessary to reduce speed of the machine.

As indicated at the left hand side of Figure 2 a square bottomed neck opening may be formed in similar manner to that above except that a plurality of waste courses indicated at S1 may be produced by means of the splicing carrier bar 46 and thread carrier 46C under control of the splicing stops 91 and 92, the carrier bar 46 being traversed frictionally by the mechanism 32 and at the same time as the positive carrier control or drive means 30 and 31 are operating to produce the lower parts of the shoulder positions.

The machine is also capable of producing comparatively narrow fabric as previously referred to with reference to Figures 5 to 7 it being understood that the particular method described of forming the comparatively narrow fabric avoids the use of friction drive means for the purpose such that regular loop formation in fabric is obtained (because constant lead mechanism is employed) and it is unnecessary to reduce the speed of the machine.

It is also contended that the machine will produce improved fabric by virtue of the anti-rebound stop mechanism previously referred to by which the carriers are maintained controlled at all times. Furthermore the operation of the aforesaid anti-rebound stops is controlled and timed from cams in the manner already referred to such that the action is comparatively smooth.

Furthermore the feature of providing a central non-needle division with controls in the region of the centre of the machine enables the machine to be made of shorter length than heretofore with the same number of needle divisions thereby saving floor space, also saving operators time and energy and allowing additional needle divisions to be provided if desired at either or both ends of the machine.

It will be also understood that the overall length of carrier bars and fashioning finger bars is minimized by the provision of an intermediate non-needle division and consequently the extent of compression and tension in the bars or buckling of the bars is considerably minimized.

What we claim is:

1. A multi-division straight bar knitting machine organized to knit underwear and outerwear and to fashion the same by widening or narrowing as required, of the type having a plurality of needle divisions disposed end to end and each comprising a needle bar with needles, associated knitting elements, yarn carriers having a variable amplitude of traverse, and fashioning mechanism for widening or narrowing as required, and having mechanisms, common to a plurality of needle divisions, for operating the needle bars and associated elements and for traversing the carriers to and fro in knitting fabric blanks simultaneously on all divisions, and further mechanisms for operating the fashioning mechanisms in narrowing or widening and for varying the traverse of the carriers; the traverse-varying mechanism including automatically-racked lead screws; which machine has a plurality of the said lead screws, and a plurality of hand controls for rotating them by hand, grouped at an intermediate location in the length of the machine between two adjacent needle divisions.

2. A machine according to claim 1, having a framework comprising transverse standards and longitudinally-extending members connecting them together in spaced relation and thereby defining a plurality of divisions whereof an intermediate division is identified with said intermediate location and contains the plurality of lead screws and hand controls.

3. A machine according to claim 1 having, at the intermediate location, two main lead screws with stop boxes thereon for determining carrier traverse in each needle division, hand controls for adjusting the main lead screws to determine carrier traverse at two outer selvedge of each fabric blank or at an outer or an inner selvedge, two auxiliary lead screws with stop boxes thereon for determining carrier traverse at the other outer and another inner selvedge of each fabric blank, hand controls for adjusting the auxiliary lead screws to change the position of their boxes, and hand controls for rendering the boxes of the auxiliary lead screws operative or inoperative.

4. A machine according to claim 3, having the lead screws disposed in parallel relation with the main lead screws overlapping one another and overlapping the auxiliary lead screws.

5. A machine according to claim 1, having two main lead screws, for controlling carrier traverse up to the full width of the blanks, disposed in parallel and overlapping relation, a pair of auxiliary lead screws, for respectively controlling carrier traverse over different parts of the width of the blanks, disposed in axial alignment and in parallel and overlapping relation with the main screws, a stop box on each screw, a set of carrier rods extending parallel with the screws between the boxes on the main screws and the boxes on the auxiliary screws, stop bolts on the boxes, stop lugs on the rods for cooperation with stop bolts of the main boxes, and stop lugs on at least one of the rods for cooperation with stop bolts of the auxiliary boxes.

6. In a multi-division straight bar knitting machine of the type having a plurality of needle divisions, and mechanisms for the production of a fashioned blank simultaneously on each of the needle divisions by a sequence of automatically-conducted operations including fashioning, the combination of a framework comprising transverse standards and longitudinally-extending members connecting them together in spaced relation and thereby defining, between successive standards, divisions whereof an intermediate one is a non-needle division and the others are needle divisions, and a plurality of hand controls grouped in the region of the non-needle division and including hand controls for setting the machine for automatically-conducted operations, and hand controls for modifying automatically-conducted operations, whereby operations of the machine may be controlled from said region.

7. A machine according to claim 6, having thread carriers for each needle division and having, accommodated in the non-needle division, automatically-racked lead screw mechanisms, with stop boxes thereon, for controlling fashioning and for correspondingly limiting the traverse of carriers in all needle divisions, and hand controls for winding the stop boxes in and out.

8. A machine according to claim 6, having thread carrier for each needle division and having, accommodated in the non-needle division, automatically-racking lead screw mechanisms for controlling fashioning and for correspondingly varying the traverse of carriers in all needle divisions, with hand controls for turning the lead screw mechanisms by hand, starting and stopping the automatic racking, and varying the automatic racking.

9. A machine according to claim 6 having, accommodated in the said non-needle division a pair of main and a pair of auxiliary automatically-racking lead screws and stop boxes thereon for control of thread carriers, hand controls for controlling automatic racking of the lead screws and corresponding automatic adjustment of the stop boxes for automatic fashioning, hand controls for controlling the extent of automatic racking and consequently the extent of fashioning hand controls for manual racking of the lead screws to adjust the stop boxes manually for manual setting of the stop boxes, and hand displaceable bolts in the stop boxes for releasable connection between them and thread carriers for manually selecting the carriers to be controlled.

10. A straight bar knitting machine of the type for producing underwear and outerwear comprising a framework of longitudinal members and transverse standards spaced to form a plurality of divisions, a needle bar and appropriate associated mechanism including thread carriers in each division except one intermediate non-needle division, and, accommodated in the non-needle division, a pair of overlapping main adjustable lead screws, a pair of end to end auxiliary adjustable lead screws disposed below the main lead screws, stop boxes on the lead screws for control of thread carriers, thread carrier bars disposed between the main and auxiliary lead screws, stop bolts in the stop boxes, and stop lugs on top and bottom parts of the carrier bars for engagement by the stop bolts.

11. A straight bar knitting machine of the type for producing underwear and outerwear comprising a framework of longitudinally members and transverse standards spaced to form a plurality of divisions, a needle bar and appropriate associated mechanism including thread carriers in each division except one intermediate non-needle division, thread carrier drive mechanism in certain of the needle divisions, overlapping main and auxiliary adjustable lead screws for control of the thread carriers accommodated in the non-needle division, and drive means common to the adjustable lead screws and the carrier drive mechanism to operate them in desired relationship.

12. A machine according to claim 6, having a main cam shaft and, accommodated in the non-needle division, shogging mechanism for the cam shaft to change between the production of non-fashioned and fashioned work, pawl and ratchet mechanism with a selection device, associated with the shogging mechanism, for changing the frequency of fashioning, and hand controls for control of the ratchet means and of the selection device and consequently the shogging mechanism, whereby the frequency of fashioning of fabric produced by the machine may be manually controlled from the non-needle division.

13. A machine according to claim 6 having a main cam shaft, and, accommodated in the non-needle division, cams on the main shaft for determining the quality of fabric produced by the machine, and hand controls for rendering desired of the cams operative and inoperative for changing the quality at desired times, whereby the quality of fabric produced on the machine may be manually controlled from the non-needle division.

14. In a multi-division straight bar knitting machine of the type comprising a plurality of needle divisions, automatically-operating mechanism for the production of a fashioned blank in each needle division, and a plurality of hand controls for manual control at appropriate times of parts of said mechanisms affecting shape, fashioning and stitch length of the blanks, the combination of filling-up points in each needle division, a non-needle division intermediate the needle divisions, means mounting a plurality of the hand controls in the non-needle division and a hand control in the region of the non-needle division for bringing the filling-up points into operation.

15. In a machine according to claim 1, the combination of striping mechanism, and hand controls for said mechanism disposed in the vicinity of the intermediate location.

16. In a machine according to claim 1, the combination of draw-off mechanism for the blanks and operating means therefor, and hand controls for said means disposed in the vicinity of the intermediate location.

References Cited in the file of this patent

UNITED STATES PATENTS

| | | |
|---|---|---|
| 2,084,732 | Haines | June 22, 1937 |
| 2,166,959 | Lieberknecht | July 25, 1939 |
| 2,353,973 | Shortland | July 18, 1944 |
| 2,366,227 | Zwicky | Jan. 2, 1945 |
| 2,428,465 | Lynam et al. | Oct. 7, 1947 |
| 2,571,314 | Vaclavik | Oct. 16, 1951 |
| 2,586,205 | Cobert | Feb. 19, 1952 |

FOREIGN PATENTS

| | | |
|---|---|---|
| 613,823 | France | Sept. 4, 1926 |